United States Patent
Ye et al.

(10) Patent No.: US 8,533,799 B2
(45) Date of Patent: Sep. 10, 2013

(54) SERVICE INTEGRATION PLATFORM SYSTEM AND METHOD FOR INTERNET SERVICES

(75) Inventors: Wei Ye, Hangzhou (CN); Yueping Liang, Hangzhou (CN); Wenchu Cen, Hangzhou (CN); Lin Wang, Hangzhou (CN); Jin Zhao, Hangzhou (CN); Tingjia Chen, Hangzhou (CN); Seshu Zheng, Hangzhou (CN); Yi Zeng, Hangzhou (CN)

(73) Assignee: Alibaba Group Holding Limited (KY)

( * ) Notice: Subject to any disclaimer, the term of this patent is extended or adjusted under 35 U.S.C. 154(b) by 654 days.

(21) Appl. No.: 12/456,803

(22) Filed: Jun. 22, 2009

(65) Prior Publication Data

US 2009/0328181 A1    Dec. 31, 2009

(30) Foreign Application Priority Data

Jun. 26, 2008   (CN) .......................... 2008 1 0126112

(51) Int. Cl.
  *G06F 21/20*  (2006.01)
  *G06F 21/31*  (2013.01)
  *H04L 29/06*  (2006.01)
(52) U.S. Cl.
  CPC ............... *G06F 21/31* (2013.01); *H04L 63/08* (2013.01)
  USPC ....... 726/7; 726/27; 726/28; 726/29; 709/238
(58) Field of Classification Search
  USPC ............................................................ 726/9
  See application file for complete search history.

(56) References Cited

U.S. PATENT DOCUMENTS

| | | | |
|---|---|---|---|
| 6,208,658 B1 | 3/2001 | Pickett | |
| 6,343,074 B1 | 1/2002 | Pickett | |
| 6,498,791 B2 | 12/2002 | Pickett et al. | |
| 6,681,232 B1 | 1/2004 | Sistanizadeh et al. | |
| 6,961,668 B2 | 11/2005 | Bodin et al. | |
| 7,006,614 B2 | 2/2006 | Feinberg et al. | |
| 7,134,122 B1 | 11/2006 | Sero et al. | |
| 7,219,327 B1 * | 5/2007 | Jacobs et al. | 717/104 |
| 7,603,375 B2 * | 10/2009 | Ng et al. | 1/1 |
| 2003/0005090 A1 * | 1/2003 | Sullivan et al. | 709/220 |
| 2003/0120502 A1 * | 6/2003 | Robb et al. | 705/1 |
| 2004/0015868 A1 | 1/2004 | Dutta et al. | |
| 2004/0015950 A1 | 1/2004 | Dutta et al. | |
| 2004/0064822 A1 * | 4/2004 | Noda | 719/311 |
| 2004/0083297 A1 | 4/2004 | Gazzetta et al. | |
| 2004/0117759 A1 * | 6/2004 | Rippert et al. | 717/100 |
| 2004/0143811 A1 * | 7/2004 | Kaelicke et al. | 717/101 |
| 2005/0108677 A1 * | 5/2005 | Jain et al. | 717/100 |
| 2005/0188345 A1 * | 8/2005 | Chang et al. | 717/101 |
| 2005/0256882 A1 * | 11/2005 | Able et al. | 707/10 |

(Continued)

*Primary Examiner* — Matthew Henning
(74) *Attorney, Agent, or Firm* — Van Pelt, Yi & James LLP

(57) ABSTRACT

A service integration platform system includes an interface configured to receive a service request initiated by an Independent Software Vendor (ISV) and one or more processors configured to authenticate the service request and in the event that the service request is authenticated, route the service request to an Internet Service Provider (ISP) providing the service to be further processed. The service request is routed to a deployment environment provided by the ISP in the event that the service request is received on a deployment Universal Resource Identifier (URI) corresponding to the deployment environment; the service request is routed to a test environment provided by the ISP in the event that the service request is received on a test URI corresponding to the test environment.

26 Claims, 5 Drawing Sheets

(56) References Cited

U.S. PATENT DOCUMENTS

| | | |
|---|---|---|
| 2005/0289538 A1 | 12/2005 | Black-Ziegelbein et al. |
| 2006/0195816 A1* | 8/2006 | Grandcolas et al. .......... 717/101 |
| 2006/0282897 A1* | 12/2006 | Sima et al. ...................... 726/25 |
| 2006/0294199 A1* | 12/2006 | Bertholf ........................ 709/217 |
| 2007/0038994 A1 | 2/2007 | Davis et al. |
| 2007/0234272 A1 | 10/2007 | Hegyi |
| 2008/0072239 A1* | 3/2008 | Liang et al. ................... 719/311 |

* cited by examiner

SERVICE INTEGRATION PLATFORM SYSTEM AND METHOD FOR INTERNET SERVICES

CROSS REFERENCE TO OTHER APPLICATIONS

This application claims priority to PRC Patent Application No. 200810126112.6 entitled SERVICE INTEGRATION PLATFORM SYSTEM AND A METHOD FOR PROVIDING INTERNET SERVICES filed Jun. 26, 2008 which is incorporated herein by reference for all purposes.

FIELD OF THE INVENTION

The present invention relates to the field of network service, and in particular to a service integration platform system and a method for providing Internet services.

BACKGROUND OF THE INVENTION

With the maturation of Service-Oriented Architecture (SOA), Representational State Transfer (REST) style of software architecture has become more and more popular, and Open Application Program Interface (Open API) gradually has become a new emerging Internet resource. Traditional Internet software enterprises have been attempting new roles as service providers to further open their service resources, thereby providing a new open mode for the development of websites. The emergence of Web 2.0 brings up many Independent Software Vendors (ISVs) who create Web-based software that utilizes network service resources. These ISVs combine services provided by different Internet Service Providers (ISPs) according to requirements of customers to create various interactive, innovative applications.

Presently, some big service providers attract ISVs with Open APIs to build distinctive applications specifically for these Open APIs, so as to bring network effects that both enrich the applications offered by the service providers and attract customers for the service providers.

Existing Open API platforms are typically single ISP open models, which means that a single ISP provides a complete set of service releases including solutions such as security, accounting and monitoring. The single ISP open model is not very convenient for small ISPs and ISVs to participate in utilizing Internet resources.

BRIEF DESCRIPTION OF THE DRAWINGS

Various embodiments of the invention are disclosed in the following detailed description and the accompanying drawings.

DETAILED DESCRIPTION

Figure 1:
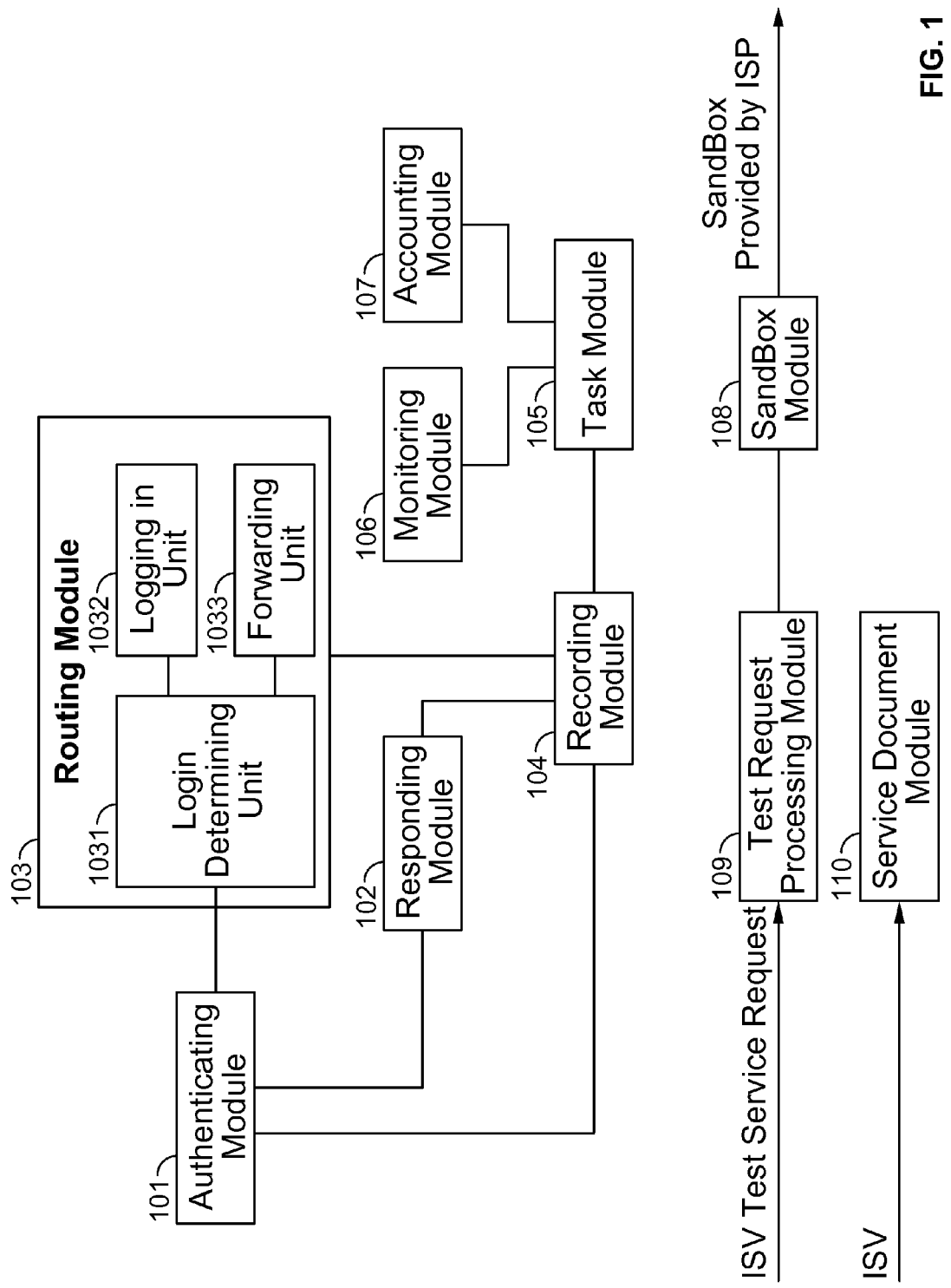
FIG. 1 is a block diagram of an embodiment of a service integration platform system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

It has been determined that current single ISP open mode has a number of disadvantages. From the perspective of the ISP, the typical ISP today is often a large scale website with the capability of providing and implementing a full set of Open API solutions. But an ISP of middle or small size typically has trouble constructing its own developers community because of lack of brand recognition, technical strength and client resource, thus it typically does not have good development prospects. Additionally, various non-business requirements need to be considered for an open API, in particular security, accounting and monitoring, which are often more technically challenging and sometimes can become the bottleneck of an Open API environment.

From the perspective of the ISV, applications developed by an ISV today usually concentrate on services of one ISP. With the present model, when an application needs to integrate services of a plurality of ISPs, such as goods searching, logistics paying and electronic map, the ISV typically has to expend much additional effort to develop with multiple ISPs and faces higher barrier to entry with respect to system security, joint debugging, integration test, and so on. Accordingly, with the existing conventional single ISP open model, the aggregation effect resulted from integration of different ISP services cannot be easily realized. Meanwhile, different security policies may make the ISVs concentrate on some non-business processes and thus decrease the development efficiency.

In light of this, a service integration platform system has been developed to integrate services of various ISPs. Non-business functions such as security, accounting, monitoring and routing are implemented by the service integration platform system. For the ISV, integrating and accessing services on the service integration platform system with a uniform criterion and standard will greatly decrease the overhead of integrating a heterogeneous service system. FIG. 1 is a block diagram of an embodiment of a service integration platform system. In this example, service integration platform system 100 includes an authenticating module 101, a responding module 102 and a routing module 103. System 100 also includes a number of optional modules, including a recording module 104, a task module 105, a monitoring module 106 and an accounting module 107. Other embodiments of service integration platform systems may include one or more of the optional modules. In some embodiments, each module is implemented as one or more software processes executing on one or more processors. In some embodiments, the modules run on one or more single or multi-processor computers. In this example, an authenticating module 101 is configured to authenticate an ISV when the ISV initiates a service request. In some embodiments, the authenticating module 101 is configured to authenticate one or more of the following: whether a parameter of the ISV is legitimate, whether a service is present, whether a signature is needed, whether authority is possessed, whether the signature is valid, whether a timestamp of the ISV is overdue and whether a token is valid. Other authentication criteria may be included in other embodiments.

In the event that the ISV fails to authenticate, responding module 102 is triggered instead. In some embodiments, the response module generates an error message indicating that a service request is not permitted or is otherwise in error. Different responses can be generated for different types of errors, indicating any additional/modified information/actions that may be needed to correct the error. For example, if the error results from needing user binding, corresponding bound user address and related information are returned; if the error results from incorrect parameter being entered and detected, related prompting information can be returned.

In the event that the ISV is authenticated, routing module 103 is triggered. In this example, routing module 103 is configured to route the service requested by the ISV to an ISP providing the requested service.

In the example shown, the routing module 103 includes a login determining unit 1031, a logging in unit 1032 and a forwarding unit 1033. The login determining unit 1031 is configured to determine whether the service requested by the ISV requires the ISV to login. Logging in unit 1032 is triggered with positive determination and a forwarding unit 1033 is triggered with negative determination. Logging in unit 1032 is configured to initiate a login request to the ISP providing the service according to the service request of the requesting ISV initiating the service request and to pass on a token generated when the ISV logs on to the ISP. The forwarding unit 1033 is configured to forward the service request of the ISV initiating the service request to the ISP providing the service and forwarding a response according to the processing results of the ISP.

Optional recording module 104 is configured to record a log of the work of the authenticating module 101, the responding module 102 and the routing module 103.

Optional task module 105 is linked to the recording module 104 and is configured to analyze the log recorded by the recording module.

Optional monitoring module 106 is configured to monitor system access according to the analysis of the log by the task module. Optional accounting module 107 is configured to account for payment according to the analysis of the log by the task module.

In this example, the service integration platform system provides testing service for the ISV's applications. To provide the testing service, the service integration platform system further includes a Sand Box module 108 configured to connect to various test environments (Sand Boxes) provided by different ISPs. As used herein, a Sand Box refers to a test environment in which software can be tested safely, without affecting the greater environment that has been deployed and servicing customers. It is assumed that most ISPs would offer their own Sand Box environment to perform various tests to ensure that the applications offered by ISVs comply with their requirements such as security and reliability. Also included is a test request processing module 109 for connecting, when at least one ISV initiates a test service request, the test service of the ISV initiating the test service request to a Sand Box provided by an ISP providing the test service via the Sand Box module.

Further, the service integration platform system may include a service document module 110 configured to allow the ISV to provide service documents such as manuals.

Figure 2:
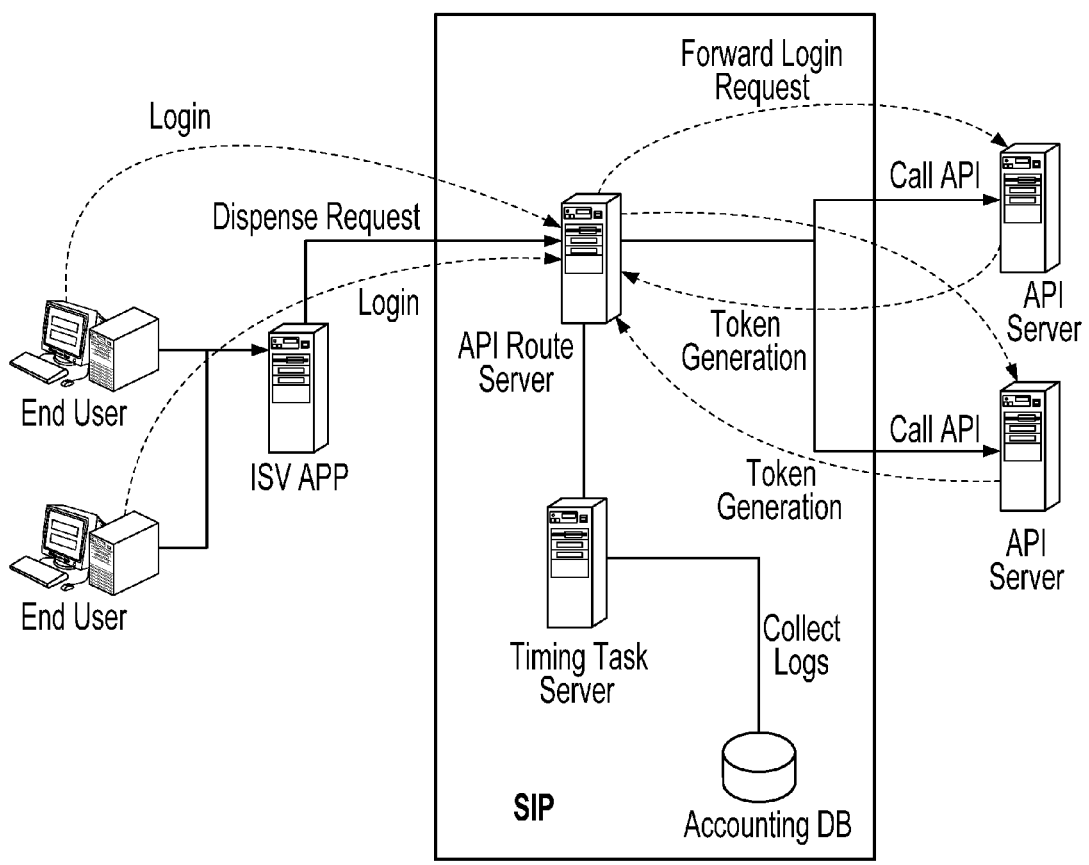
FIG. 2 is a schematic diagram illustrating an example application environment in which an embodiment of the service integration platform system is deployed.

FIG. 2 is a schematic diagram illustrating an example application environment in which an embodiment of the service integration platform system is deployed. In this example, the service integration platform system is built based on a Service Integration Platform (SIP). The SIP connects ISVs and ISPs via the Internet, a local area network (LAN) or any other appropriate networks. In this example, the ISV includes two End Users and an ISV Application (ISV APP). This includes two API servers. The ISV APP may be a general Internet application or a client desktop application. For example, a communication path with the SIP can be built via HTTP (Hypertext Transfer Protocol) accessing and the SIP and the ISP can be linked via the HTTP scheme. In some embodiments, Secure Socket Layer (SSL) or dedicated line scheme may be employed to ensure security for HTTP. In this example, SIP hardware includes an API Route Server and a timing task server. That is, the authenticating module, the responding module, the routing module and the recording module of the service integration platform system may be arranged specially on the API Route Server to primarily process functions of service routing and security authentication. Meanwhile, records of visiting the server may be directly stored locally by the recording module in a log. A timing task module of the service integration platform system is arranged on the timing task server, the timing task server collects logs and analyzes the logs asynchronously in parallel. The analysis is provided to the monitoring module and the accounting module to use. The accounting module is shown in FIG. 2 arranged on an accounting DB (Database).

With the above arrangement, in this example, the API Route Server can process security, authentication and accessing record uniformly, authenticate the identity of an ISV, authenticate the identity of a user, respond to a service call and count service calls. The accounting DB may support a variety of accounting schemes, including free of charge, monthly accounting, pay-per-call accounting and accounting by flow rate.

As shown in FIG. 2, the End User initiates a login request and the ISV APP distributes the request. The API Route Server calls the API server of the ISP, forwards a login request and receives a token generated by the API server. The timing task server in the SIP collects logs and analyzes the logs to provide the analysis to the accounting DB to use. In this example, the ISV APP obtains data mainly according to some basic interfaces provided by the ISP, or obtains computing results to design an application meeting the requirement of a user.

The generated token is sometimes considered as an identity token in implementation. When a user is logged in, the identity of the user in the ISV system and the identity in the SIP may be associated. In each request, the identity of the user in the ISV system is associated with a generated identity token of the SIP and the SIP deems the user of the ISV application with the token as having authority to operate the related information of the user of the ISP.

It can be seen from the above embodiment that a carrier for communicating data between the ISP and the ISV is provided upon implementing the service integration platform system in the SIP. On the platform system, resources and services of the ISP may be integrated deeply and sufficiently and it is convenient for the ISV to access a third party service and access the software integration platform quickly; Meanwhile, the SIP provides comprehensive and uniform policy of security, accounting and authentication for the ISP. The ISP can complete in the SIP the management functions such as real time monitoring, issuance, testing and routing of its services, so that the higher commercial value may be achieved.

With respect to at least one ISV initiating a test service request, a way of providing test services is supplied, so that the seamless joining between a test environment and a deployment environment may be implemented when an application is developed based on the service integration platform system. Now the embodiment will be described.

Figure 3:
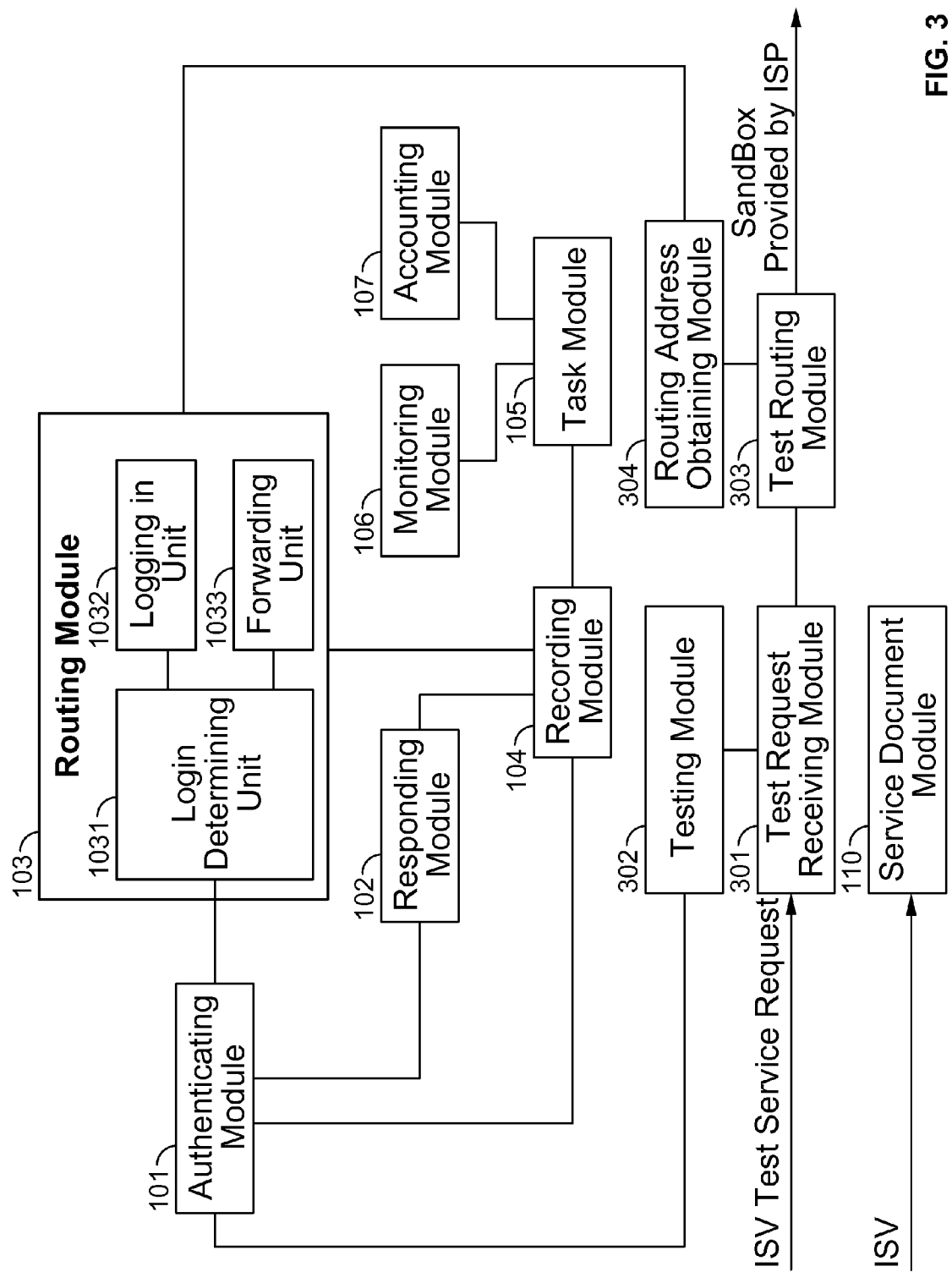
FIG. 3 is a block diagram of another embodiment of a service integration platform system that provides additional test functions.

FIG. 3 is a block diagram of another embodiment of a service integration platform system that provides additional test functions. As shown in FIG. 3, in addition to the function modules included in the above system such as authenticating module 101, routing module 103 and responding module 102, for test applications of the ISV, the system further includes: a test request receiving module 301 configured to trigger a testing module and a test routing module upon receiving the test service request initiated by the at least one ISV; a testing module 302 configured to test a system debug procedure of the ISV initiating the test service request; a test routing module 303 configured to route the test service requested by the ISV to the ISP providing the test service to execute application interface test.

In some embodiments, the routing module 103 may further route the tested service request of the ISV to the ISP providing the service to process after the ISV application interface test at the ISP providing the test service is completed. The authenticating module 101 may further authenticate the service request initiated by the ISV according to the test result of system debugging procedure of the testing module 302 after the application interface test of the ISV initiating the test service request is completed.

The system shown in this example further includes a routing address obtaining module 304 configured to obtain an application interface testing address and a service address of each ISP.

The test routing module 303 is further configured to route the test service to the application interface testing address of the ISP providing the test service. The routing module 103 further routes the tested service request of the ISV to the service address of the ISP providing the service after the application interface test.

In an embodiment, the system optionally includes a service document module 110 configured to provide service descriptive documents of each ISP to at least one ISV. A service descriptive document includes information such as descriptions about the service function calls, the inputs/outputs of the service calls and error codes. It serves as a development guide for the ISV, who will follow the descriptions and make the application conform to the description.

The service integration platform system provides two sets of environments: a test environment and a deployment environment, for the ISV to use in developing applications. High uniformity between the two development environments is to be required, because in ISV's development, significant differences between the two development environments would definitely reduce the test effectiveness, the real environment cannot be simulated truly and the risk of formal online environment would increase. Therefore, a seamless system of service testing and releasing is needed, so as to reduce the amount of contents to be modified on a tested service to release and thereby achieve smooth transition of service test development.

If the service integration platform system including the test environment and the deployment environment provided by the ISP are deployed separately and then integrated the related service data in the application development process of the ISV would be insulated from each other in the two different environments, which not only increases the development cost of the ISV, but also requires duplicative data. For example, two copies of certain inherent data for similar applications, such as identity and application private key, would be required, one for testing, another for normal application, thus increasing the development cost and testing cost for the developer and increasing the risk of formal online deployment.

Figure 4:
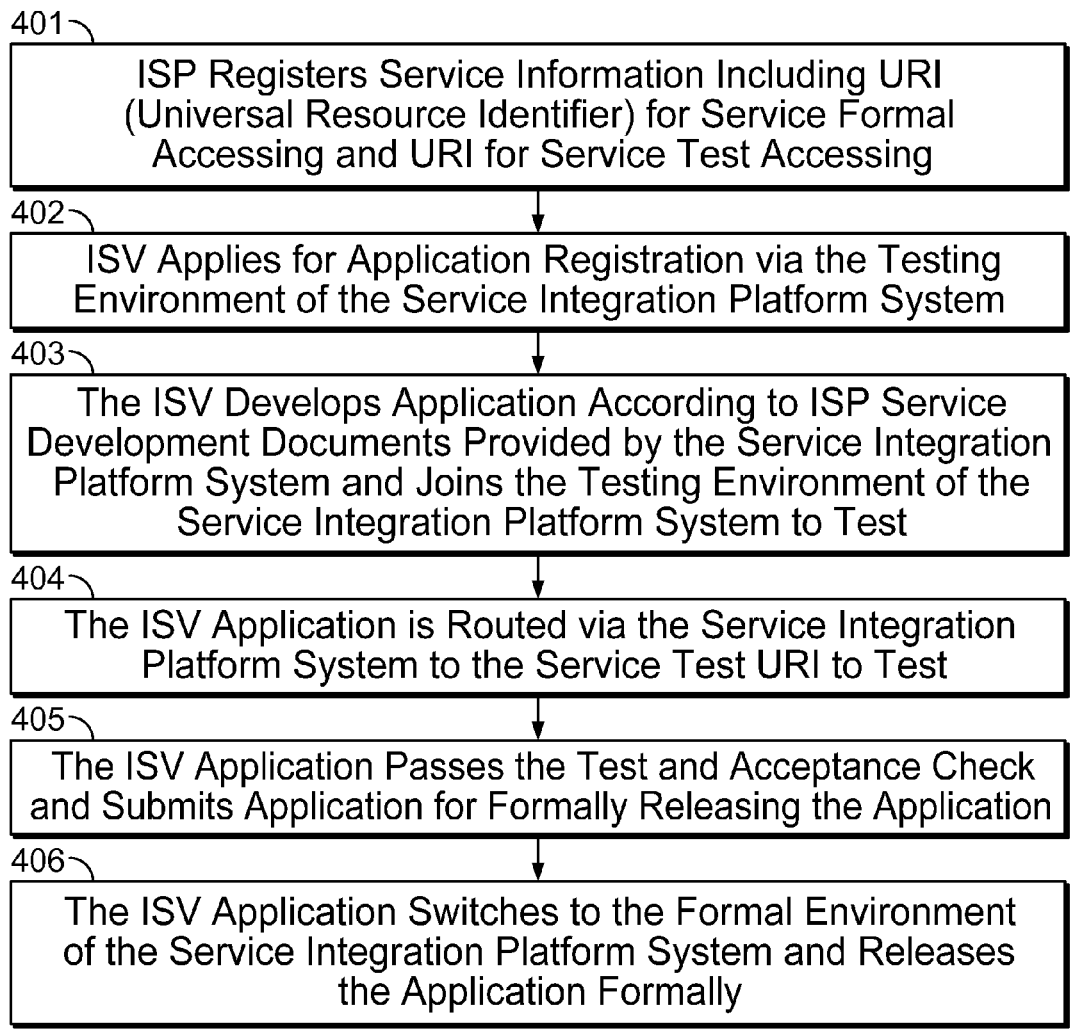
FIG. 4 shows an implementing flow schematic view of the test and application in an embodiment of an ISV development process.

In order to share the service data of the testing environment and the deployment environment of the ISV, decrease the cost of creating data repeatedly, the same service and system data are simulated simultaneously to ensure uniformity of data in developing process and releasing process and reduce the risk caused by data change. In practice, the testing environment and the deployment environment may be differentiated by the difference between selective routes and between hardware addresses of the applications themselves. Specially, FIG. 4 shows an implementing flow schematic view of the test and application in an embodiment of an ISV development process, the flow may include the processes as below:

In 401, the ISP registers service information, including a URI (Universal Resource Identifier) for formal access and a different URI for test access. For example, the URI of sip.alisoft.com/sip/rest is used for formal access to the deployment environment and the URI sipdev.alisoft.com/sip/rest is used for test access to the testing environment.

In 402, the ISV applies for application registration via the testing environment of the service integration platform system.

In 403, the ISV develops application according to ISP service development documents provided by the service integration platform system and joins the testing environment of the service integration platform system to test.

In 404, the ISV application is routed via the service integration platform system to the service test URI to be tested.

In 405, the ISV application passes the test and acceptance check and submits application for formally releasing the application for deployment.

In 406, the ISV application is approved for formal release. It switches to the deployment environment of the service integration platform system and releases the application formally.

It can be seen from the above flow that the ISV fully simulates the deployment environment in the test process, almost no additional cost is required for switching to the deployment environment and only the accessing address requested by the service integration platform system is to be modified, thus the data in the testing environment is utilized to the maximum, the cost for switching to the deployment environment is minimized, the ISV development complexity and cost are reduced and the probability of occurrence of application bug due to data change is lowered.

The mechanism of the above embodiment is that the service integration platform system provides a deployment Universal Resource Identifier (URI) that corresponds to a deployment environment that offers the actual services and a separate test URI that corresponds to a test environment that gives access to testing services. In the event that a service request is received on the test URI, the service request by the ISV is routed through the service integration platform system to the service test environment for testing. Upon successful completion of test and acceptance check, the ISV application switches to using the deployment URI for accessing the deployment environment of the service integration platform system to formally release the application. In this case, the service requests made by the ISV are routed to the actual services in the deployment environment to be processed.

ISV application development primarily involves debugging of system procedures and application interfaces. Debugging system procedures includes debugging platform controlling processes of security, accounting, etc. The service integration platform system will issue authenticating configurations related to security to be shared between formal and test environments. The ISV only needs to pass debugging in the developing process to ensure normal operations in the deployment environment since the same data is used by the system procedures in both the formal and the testing environments. With respect to the debugging of services interfaces, interface service parameters are simulated to determine whether normal data is returned. For example, a test service call taobao.user.get requires a user name parameter with a specific user name. If the call with a test user name "Alice" returns Alice's information (in XML format), then the test call passes. If, however, an error code is returned, then the test call has failed. In most cases there is no shared data in the service call parameters since exposed services are stateless services and transmitted parameters should be self-described and self-contained. Accordingly, in developing and testing processes, sharing of released data primarily occurs at platform level data, that is, only system debugging procedure data is shared, while service level data (i.e. application interface debugging data) is not shared. Thus repeated creation of data is reduced and uniformity between developed data and released data is maintained through sharing the service data of the testing environment and the deployment environment of the ISV.

With respect to the ISP, so long as the environments linked to the two addresses are consistent, the environments linked to the two addresses may be the same one or two separate environments. Whether there is a single or two separate environments is to be determined by the ISP itself. The ISP may also determine whether to share data or to insulate data between the two environments. The ISP only needs to ensure the service interface logics of the two environments are consistent.

With respect to the ISV, in the testing process, the debug mode platform level functions of security, accounting, monitoring, etc. are identical to those in the normal mode and the uniformity of the service interface debugging is ensured through the consistency of ISP between the two environments, thereby achieving the effect of fully simulating the deployment environment in the test process of the ISV. Of course, the ISV application should be tested by pre-releasing under the deployment environment before it is employed in the deployment environment in order to ensure applicability.

Therefore, with the above solution, service data of an ISV application development is reused to the maximum, application online risk caused by data difference is reduced and seamless joining of a test environment and a deployment environment is achieved.

Figure 5:
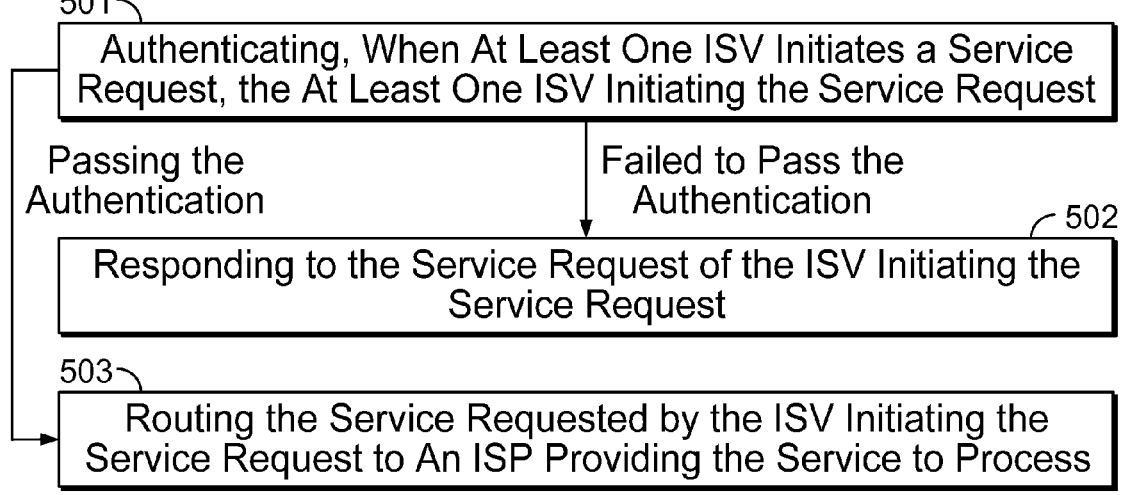
FIG. 5 is a flow chart of an embodiment of a method for providing Internet services.

FIG. 5 is a flow chart of an embodiment of a method for providing Internet services. The process may be implemented on a device such as the API route server. As shown in FIG. 5, the method may include the following processes:

In 501, a service request initiated by an ISV is authenticated. In the event that the ISV fails to pass the authentication, in 502, a failure indication is sent and the ISV is refused service. In the event that the service request successfully authenticates, in 503, the service request is routed to an ISP providing the service to be further processed.

In some embodiments, the method may further include recording a log of the authentication, the response and the routing work processed in implementing and analyzing the work log.

After recording and analyzing the work log, it is possible to monitor and account for payment according to the analysis of the work log.

Now the special implementation examples of each step will be described.

In 501, the authentication may include, for example, authenticating one or more of the following: whether parameters of the ISV initiating the service request are legitimate, whether the service is present, whether a signature is required, whether authority is possessed, whether the signature is valid, whether a timestamp is overdue and whether a token is valid and other verification testing.

In 503, routing the service requested by the ISV to an ISP providing the service to process may include, for example, determining whether the service requested by the ISV initiating the service request requires ISV login. If yes, initiating a login request to the ISP providing the service according to the service request of the ISV and generating a token according to the process of the ISP; else, forwarding the service request of the ISV to the ISP providing the service and forwarding a response according to the process of the ISP.

Figure 6:
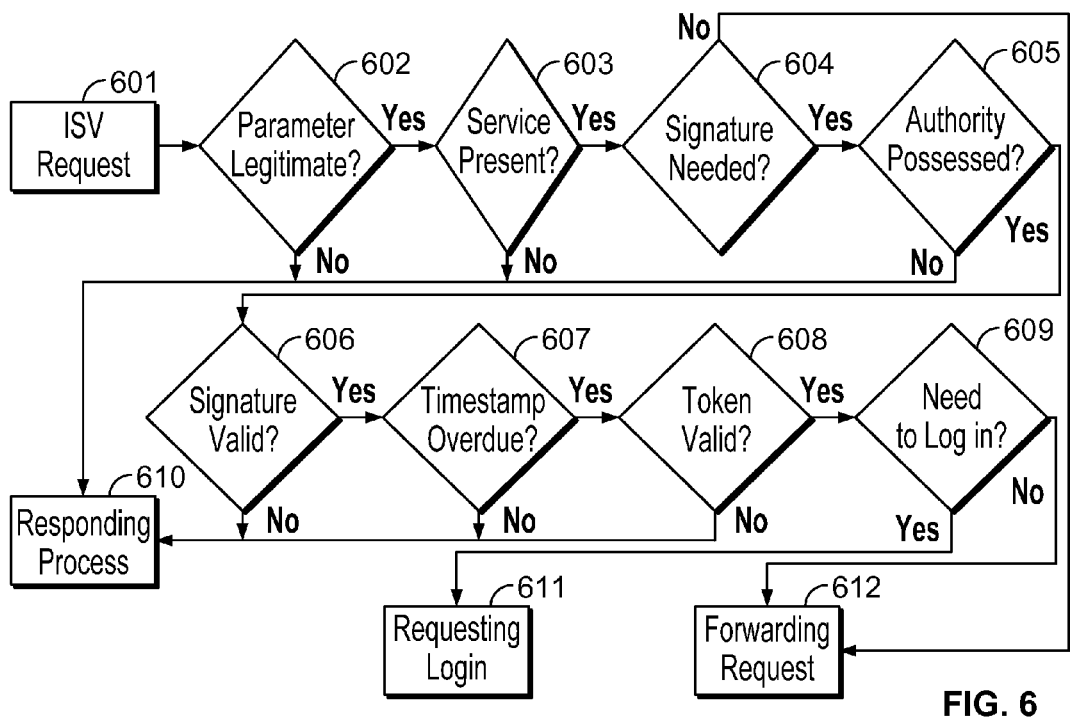
FIG. 6 is a process diagram showing an example of the authentication and routing process of the service integration platform system.

FIG. 6 is a process diagram showing an example of the authentication and routing process of the service integration platform system. The process may be implemented on, for example, an API route server, an API server or a combination.

In 601, a service request initiated by an ISV is received.

In 602, whether parameters are legitimate is determined. If yes, control is transferred to 603; if no, control is transferred to 610.

In 603, whether the service is present is determined. If yes, control is transferred to 604; if no, control is transferred to 610.

In 604, whether a signature is needed is determined. If yes, control is transferred to 605; if no, control is transferred to 612.

In 605, whether authority is possessed is determined. If yes, control is transferred to 606; if no, control is transferred to 610.

In 606, whether the signature is valid is determined. If yes, control is transferred to 607; if no, control is transferred to 610.

In 607, whether a timestamp is overdue is determined. If yes, control is transferred to 608; if no, control is transferred to 610.

In 608, whether a token is valid is determined. If yes, control is transferred to 609; if no, control is transferred to 610.

In 609, whether login is needed is determined. If yes, control is transferred to 611; if no, control is transferred to 612.

In 610, the failure conditions are handled and the service request of the ISV is denied. A response indicating the denial is generated.

In 611, a login request is initiated to the ISP according to the service request of the ISV.

In 612, the service request of the ISV is forwarded to the ISP.

Now an implementation of the application development process of the ISV will be described.

In order to implement application development of the ISV, the method may further include providing service descriptive documents of the ISP to the ISV.

In some embodiments, Sand Boxes provided by the ISPs are linked together via a Sand Box module. In some embodiments, a test requesting processing module links the test service of the ISV to the Sand Box provided by the ISP via the Sand Box module according to the received test service request of the ISV. For example, a server receiving an HTTP request on a test URI would direct the HTTP requests to the appropriate Sand Box module servicing the request.

In some embodiments, the ISV applies to create an application on the service integration platform system first. Once approved, the service integration platform system issues an application identity and an application encryption key to the ISV.

The ISV then obtains a service descriptive document of each ISP from the service descriptive documents provided by the service document module.

The service integration platform system applies for ISP service to be utilized according to the service accessing level of the ISV.

In the process of developing and testing an application, the ISV is linked to the Sand Box of each ISP via the Sand Box environment of the service integration platform system.

After testing, the ISV may release the application and submit an application online request to the service integration platform system.

Figure 7:
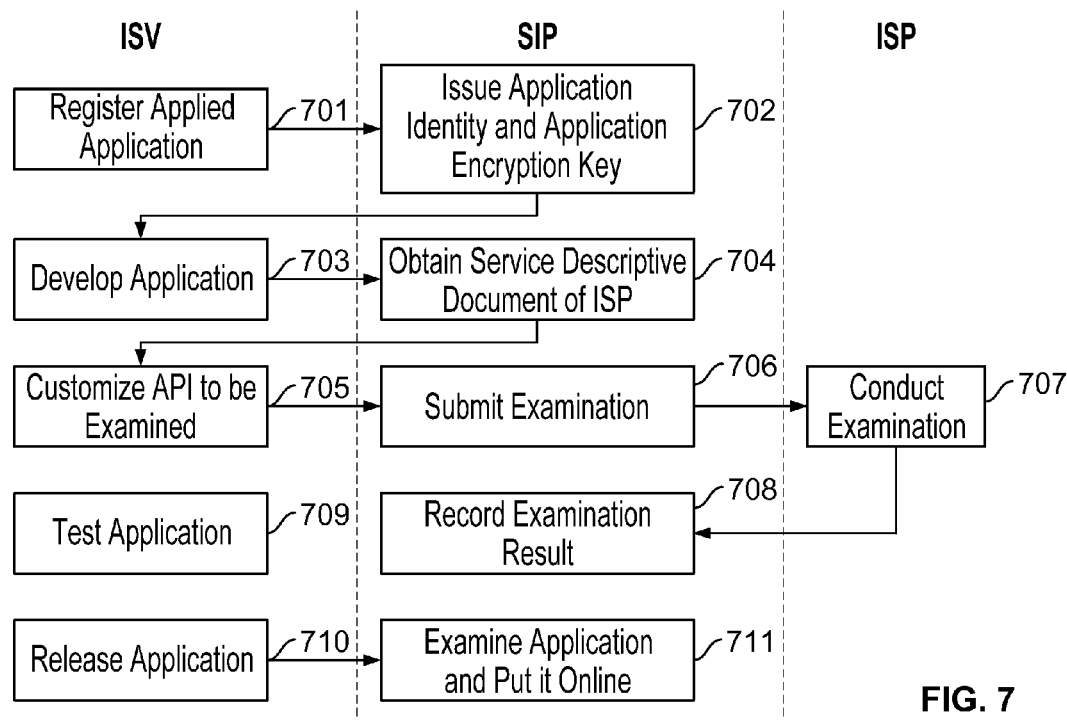
FIG. 7 is a schematic view showing application development in the SIP.

Now implementation in the SIP will be described. FIG. 7 is a schematic view showing application development in the SIP. As shown in FIG. 7, the method may be implemented as following:

In 701, the ISV registers an applied application.

In 702, the SIP issues an application identity and an application encryption key.

In 703, the ISV develops the application. For example, an internet banking application may be developed to allow individual users to access their bank accounts and perform various transaction related activities. The application requires authentication with an ISP providing banking service and provides user interfaces for the users to perform certain tasks such as review bank statements and make transfers. The authentication function and the user interfaces are tested separately.

In 704, the ISV obtains service descriptive document of the ISP.

In 705, the ISV customizes an API to be examined. Some APIs must be examined and authorized by the ISP before they can be utilized by the ISV. For example, certain APIs for data analysis are only accessible if the ISV subscribes to the data analysis service.

In 706, the SIP submits the examination to the ISP.

In 707, the ISP conducts the examination, including by reviewing a pre-approved API list and/or reviewing service agreement with the ISV and determines whether the ISV is authorized to use the API.

In 708, the SIP records the examination result upon passing the examination.

In 709, the ISV tests the application.

In 710, the ISV releases the application.

In 711, the SIP examines the application and puts it online.

After the application is developed according to the above solution, the service integration platform system may provide quick accessing and delivering service to the ISV, thus simplifying the integration and management of services and providing common policy of security, accounting and authentication. Furthermore, the simple and standardized accessing solution is provided for the heterogeneous systems as Java, NET and PHP with the uniform Sand Box test environment.

For at least one ISV initiating a test service request, the techniques described herein for providing the test service can achieve seamless joining of the test environment and the deployment environment when the ISV develops the application. Now the detailed implementation method will be described.

Upon receiving the test service request initiated by the at least one ISV, a system debugging procedure of the ISV initiating the test service request is tested, and the test service requested by the ISV is routed to the ISP providing the test service to execute application interface test.

Further, in order to process the procedure after testing is done, the method may include routing the tested service request of the ISV to the ISP providing the service to process after the application interface test of the ISV at the ISP providing the test service is completed.

In some embodiments, the method further includes authenticating the service request initiated by the ISV according to the test result of system debugging procedure after the ISV application interface test is completed.

In some embodiments, the method further includes obtaining an application interface testing address and a service address of each ISP, routing the test service to the application interface testing address of the ISP providing the test service; and routing the tested service request of the ISV to the service address of the ISP providing the service after the application interface test is completed.

It can be seen from the above description that integration and routing of services of a plurality of ISPs are solved by the service integration platform system, so that the ISP may concentrate on providing services without considering non-business functional requirements, such as security, accounting and authentication. Furthermore, difficulty in learning and accessing to services of a plurality of ISPs is effectively reduced for the ISV and the development process of the ISV is simplified.

In terms of the ISP, the occurrence of a new type of ISP is supported. This type of ISP may re-develop and re-package based on services of basic service providers and release the developed service to the service integration platform.

In terms of the ISV, the service integration platform system provides basic service accessing and managing platform for developer oriented Open API communities, so that an ISV and an individual developer can search, study, invoke and test an API provided by an ISP in accordance with its or his own application scene in the system.

Accordingly, the service integration platform system can not only make the ISP concentrate on data service design, but also make the ISV concentrate on developing applications/products. The ISP and the ISV application can be combined flexibly and effectively by services in the open, cooperative and uniform environment, thus enlarging the social value of the whole ecosphere. Further, Internet services will really become an abundant resource pool because more ISPs of middle or small size in addition to big ISPs will join.

Furthermore, tests of the two parts of the system debugging procedure and the application interface are processed separately, that is, the service integration platform system processes the test related to the system debugging procedure and shares data of this part, the ISP processes the test of the application interface so as to switch to the deployment environment with minimal cost, reduce the ISV development complexity and cost and reduce the probability of occurrence of application bugs caused by data change.

Of course, one skilled in the art may make various changes and modifications to the present invention without deviating from the spirit and scope of the present invention. Accordingly, if these changes and modifications to the present invention belong to the scope of the claims of the present invention and its equivalents, the present invention intends to include these changes and modifications.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A service integration platform system comprising:
an interface configured to receive a service request initiated by an Independent Software Vendor (ISV);
one or more processors configured to:
provide a deployment Universal Resource Identifier (URI) that corresponds to a deployment environment that offers actual services and a test URI that corresponds to a test environment that gives access to test services, wherein the test URI is separate and different from the deployment URI;
authenticate the service request;
in the event that the service request is authenticated, route the service request to an Internet Service Provider (ISP) providing the service to be further processed, including:
determining whether the service request is received on a test URI or a deployment URI;
in the event that the service request is received on the test URI, routing the service request to the test environment for testing;
in the event that the service request is received on the deployment URI, routing the service request to the deployment environment for further processing;
wherein:
the deployment environment and the test environment share at least security related authentication data; and
the authenticating of the service request comprises:
determining whether a parameter of the ISV is legitimate; and
in the event that the parameter is legitimate:
determining whether a service relating to the service request is present; and
in the event that the service is present, forwarding the service request to the ISP.

2. The system of claim 1, wherein one or more processors are further configured to:
determine that the service requested by the ISV initiating the service requires login to the ISP;
initiate a login request to the ISP;
generate a token according to the processing of the ISP; and
forward the service request of the ISV to the ISP.

3. The system of claim 1, wherein the one or more processors are further configured to record a log of the work associated with authenticating and routing.

4. The system of claim 3, wherein the one or more processors are further configured to analyze the log.

5. The system of claim 4, wherein the one or more processors are further configured to monitor system access according to the analysis of the log.

6. The system of claim 4, wherein the one or more processors are further configured to account for payment according to the analysis of the log.

7. The system of claim 1, wherein the one or more processors are further configured to link a Sand Box provided by the ISP to a test service of the ISV.

8. The system of claim 1, wherein the one or more processors are further configured to test a system debugging procedure in the event that the service request is routed to the test environment.

9. The system of claim 8, wherein the one or more processors are further configured to authenticate the service request initiated by the ISV according to the test result of the system debugging procedure.

10. The system of claim 1, wherein the one or more processors are further configured to test an application interface in the event that the service request is routed to the test environment.

11. The system of claim 1, wherein the one or more processors are further configured to obtain an application interface testing address and a service address of each ISP and route the service request to the application interface testing address in the event that the service request is received on the test URI.

12. The system of claim 1, wherein the one or more processors are further configured to provide service descriptive documents of each ISP to at least one ISV.

13. The system of claim 1, wherein the determining of whether the service relating to the service request is present includes:
determining whether a signature is needed; and
in the event that the signature is needed:
determining whether the signature is valid; and
in the event that the signature is invalid, halting the service request.

14. A method for providing Internet services comprising:
providing a deployment Universal Resource Identifier (URI) that corresponds to a deployment environment that offers actual services and a test URI that corresponds to a test environment that gives access to test services, wherein the test URI is separate and different from the deployment URI;
receiving a service request initiated by an Independent Software Vendor (ISV);
authenticating the service request;
in the event that the service request is authenticated, routing the service request to an Internet Service Provider (ISP) providing the service to be further processed, including:
determining whether the service request is received on a test URI or a deployment URI;
in the event that the service request is received on the test URI, routing the service request to the test environment for testing;

in the event that the service request is received on the deployment URI, routing the service request to the deployment environment for further processing;

wherein:

the deployment environment and the test environment share at least security related authentication data; and the authenticating of the service request comprises:
   determining whether a parameter of the ISV is legitimate; and
   in the event that the parameter is legitimate:
      determining whether a service relating to the service request is present; and
      in the event that the service is present, forwarding the service request to the ISP.

15. The method of claim 14, further comprising:
determining that the service requested by the ISV initiating the service requires login to the ISP;
initiating a login request to the ISP;
generating a token according to the processing of the ISP; and
forwarding the service request of the ISV to the ISP.

16. The method of claim 15, further comprising recording a log associated with authenticating and routing.

17. The method of claim 16, further comprising analyzing the log.

18. The method of claim 17, further comprising monitoring system access according to the analysis of the log.

19. The method of claim 17, further comprising accounting for payment according to the analysis of the log.

20. The method of claim 14, further comprising linking a Sand Box provided by the ISP to a test service of the ISV.

21. The method of claim 14, further comprising triggering testing of a system debugging procedure in the event that the service request is routed to the test environment.

22. The system of claim 21, further comprising authenticating the service request initiated by the ISV according to the test result of the system debugging procedure.

23. The method of claim 14, further comprising testing an application interface in the event that the service request is routed to the test environment.

24. The method of claim 14, further comprising obtaining an application interface testing address and a service address of each ISP and route the service request to the application interface testing address in the event that the service request is received on the test URI.

25. The method of claim 14, further comprising providing service descriptive documents of each ISP to at least one ISV.

26. A service integration platform system comprising:
an interface configured to receive a service request initiated by an Independent Software Vendor (ISV);
an authentication module configured to authenticate the service request;
a routing module configured to:
   provide a deployment Universal Resource Identifier (URI) that corresponds to a deployment environment that offers actual services and a test URI that corresponds to a test environment that gives access to test services, wherein the test URI is separate and different from the deployment URI;
   route the service request to an Internet Service Provider (ISP) providing the service to be further processed in the event that the service request is authenticated including:
      determining whether the service request is received on a test URI or a deployment URI;
      in the event that the service request is received on the test URI, routing the service request to the test environment for testing;
      in the event that the service request is received on the deployment URI, routing the service request to the deployment environment for further processing;

wherein:

the deployment environment and the test environment share at least security related authentication data; and the authenticating of the service request comprises:
   determining whether a parameter of the ISV is legitimate; and
   in the event that the parameter is legitimate:
      determining whether a service relating to the service request is present; and
      in the event that the service is present, forwarding the service request to the ISP.

* * * * *